US008924772B2

(12) United States Patent
Abe

(10) Patent No.: US 8,924,772 B2
(45) Date of Patent: Dec. 30, 2014

(54) FAULT-TOLERANT SYSTEM AND FAULT-TOLERANT CONTROL METHOD

(75) Inventor: Shinji Abe, Tokyo (JP)

(73) Assignee: NEC Corporation, Tokyo (JP)

( * ) Notice: Subject to any disclaimer, the term of this patent is extended or adjusted under 35 U.S.C. 154(b) by 236 days.

(21) Appl. No.: 13/229,956

(22) Filed: Sep. 12, 2011

(65) Prior Publication Data

US 2012/0066545 A1    Mar. 15, 2012

(30) Foreign Application Priority Data

Sep. 14, 2010    (JP) ................ P2010-205378

(51) Int. Cl.
*G06F 11/00*    (2006.01)
*G06F 11/20*    (2006.01)
*G06F 11/16*    (2006.01)

(52) U.S. Cl.
CPC ........ *G06F 11/2028* (2013.01); *G06F 11/1654* (2013.01); *G06F 11/1645* (2013.01); *G06F 11/2038* (2013.01)
USPC ............................................ 714/5.1; 714/11

(58) Field of Classification Search
USPC ........................................................... 714/5.1
See application file for complete search history.

(56) References Cited

U.S. PATENT DOCUMENTS

| | | | | |
|---|---|---|---|---|
| 6,708,283 | B1* | 3/2004 | Nelvin et al. ................. | 714/5.11 |
| 2004/0088604 | A1* | 5/2004 | Bland et al. .................... | 714/43 |
| 2006/0150003 | A1* | 7/2006 | Abe ................................ | 714/11 |
| 2007/0260915 | A1* | 11/2007 | Knapstad et al. ................ | 714/6 |
| 2008/0120482 | A1* | 5/2008 | Jarvis et al. ..................... | 711/162 |
| 2010/0100773 | A1* | 4/2010 | Apel et al. ....................... | 714/43 |
| 2011/0078495 | A1* | 3/2011 | Higashijima et al. ........ | 714/6.21 |

FOREIGN PATENT DOCUMENTS

| | | |
|---|---|---|
| JP | S59-225428 A | 12/1984 |
| JP | H9-128354 A | 5/1997 |
| JP | 2006172220 A | 6/2006 |

OTHER PUBLICATIONS

Japanese Notice of Allowance for JP Application No. 2010-205378 mailed on Jun. 24, 2014, Translation of item No. 2 on 3rd page only.

* cited by examiner

*Primary Examiner* — Michael Maskulinski
(74) *Attorney, Agent, or Firm* — Sughrue Mion, PLLC

(57) ABSTRACT

A fault-tolerant system including a plurality of modules each further including a CPU subsystem, a fault-tolerant control unit, and an I/O subsystem, wherein the fault-tolerant control unit includes a master FT control LSI chip and at least one slave FT control LSI chip. One module is placed in an active state while the other module is placed in a standby state, so that I/O requests made by CPU subsystems of these modules are selectively delivered to I/O subsystems based on the master/slave relationship. Upon receiving fault information representing a failed subsystem which is either the CPU subsystem or the I/O subsystem found in the module, the master FT control LSI chip sends a command for controlling isolation of the failed subsystem to the slave FT control LSI chip, so that the slave FT control LSI chip controls isolation of the failed subsystem based on the command.

16 Claims, 9 Drawing Sheets

FIG. 5

| COMMAND NAME | CONTENT |
|---|---|
| NULL | NO INSTRUCTION |
| Shoot CPU | ISOLATION OF CPU SUBSYSTEM |
| Shoot IO | ISOLATION OF I/O SUBSYSTEM |
| Bring-up CPU | BUIT-IN OF CPU SUBSYSTEM |
| Bring-up IO | BUILT-IN OF I/O SUBSYSTEM |
| Go CPU SMR | ISOLATION OF COUNTERPART CPU SUBSYSTEM |
| Go IO SMR | ISOLATION OF COUNTERPART I/O SUBSYSTEM |
| Voter Wait | TEMPORARY STOP OF VOTER |

FIG. 6

| STATUS NAME | CONTENT |
|---|---|
| DMR | FULL DUPLEX-REDUNDANCY STATE OF CPU/ I/O |
| CPU SMR | SINGLE-REDUNDANCY STATE OF CPU/ DUPLEX-REDUNDANCY STATE OF I/O |
| IO SMR | DUPLEX-REDUNDANCY STATE OF CPU/ SINGLE-REDUNDANCY STATE OF I/O |
| SMR | SINGLE-REDUNDANCY STATE OF CPU/ I/O |
| CPU Broken | ISOLATED STATE OF CPU/ SINGLE-REDUNDANCY STATE OF I/O |
| IO Broken | DUPLEX-REDUNDANCY STATE OF CPU/ ISOLATED STATE OF I/O |
| Broken | ISOLATED STATE OF CPU/ I/O |
| CPU Error | ERROR DETECTION OF CPU SUBSYSTEM (ERROR DETECTION ALONE) |
| IO Error | ERROR DETECTION OF I/O SUSBSYSTEM (ERROR DETECTION ALONE) |
| Unk Error | ERROR DETECTION AT UNSPECIFIED ERRONEOUS POSITION (ERROR DETECTION ALONE) |
| DMR Violate | DEVIATION FROM DUPLEX-REDUNDANCY STATE |

FIG. 7

| MasterCount | Num | Item#1 | Item#2 | ... | Item#n |
|---|---|---|---|---|---|

FAULT-TOLERANT SYSTEM AND FAULT-TOLERANT CONTROL METHOD

The present application claims priority on Japanese Patent Application No. 2010-205378, the entire content of which is incorporated herein by reference.

BACKGROUND OF THE INVENTION

1. Field of the Invention

The present invention relates to fault-tolerant systems including multiplexed subsystems, and fault-tolerant control methods applied to fault-tolerant systems.

2. Description of the Related Art

Fault-tolerant systems (simply referred to as FT systems) have been developed as highly-reliable computer systems. For instance, Patent Document 1 discloses a fault-tolerant computer system, adopting an existing operating system (OS) precluding a duplex-redundancy functionality, which provides duplex fault-tolerant configurations each including a CPU, a VGA, and an I/O device. Upon occurrence of a fault, a routing controller rewrites an address of a request issued by the CPU so as to conceal duplex-redundancy functionality from the CPU.

Fault-tolerant systems are generally configured of multiplexed hardware modules, all of which are synchronized with each other in their operations. When a fault occurs in a certain part, a fault-tolerant system isolates a failed module while continuing processing with normal modules.

A fault-tolerant system is basically configured of duplex hardware modules, each including a CPU, a memory, and an I/O device, and a fault-tolerant controller (or an FT controller), coupled with hardware modules, which performs fault-tolerant control such as synchronous operation control and switching-at-failure control.

FIG. 9 is a block diagram showing the constitution of a fault-tolerant system 1001. The fault-tolerant system 1001 provides duplex CPU subsystems having the same configuration, namely a CPU subsystem 1100 including a main memory 1110, a CPU 1120, and an I/O hub 1130, and another CPU subsystem 1600 including a main memory 1610, a CPU 1620, and an IP hub 1630. Additionally, the fault-tolerant system 1001 provides duplex I/O subsystems, namely an I/O subsystem 1300 including I/O devices 1310 to 1330, and another I/O subsystem 1800 including I/O devices 1810 to 1830.

A fault-tolerant (FT) controller 1200 is interposed between the CPU subsystem 1100 and the I/O subsystem 1300 so as to control I/O operations between them. Another fault-tolerant (FT) controller 1700 is interposed between the CPU subsystem 1600 and the I/O subsystem 1800 so as to control I/O operations between them. The FT controllers 1200 and 1700 are connected together so as to maintain synchronous operations between subsystems, detect faults, and control isolation of failed modules.

It is possible to provide various methods for controlling isolation of failed modules, wherein FT systems are generally designed such that each module includes a hardware-isolation control section and a software-isolation control section.

For instance, the CPU subsystem 1100 including the main memory 1110 and the CPU 1120 is subject to hardware-isolation control because the CPU subsystem 1100 serves as a platform for executing software. Upon occurrence of an error in the CPU subsystem 1100, the FT controller 1200 (i.e. hardware) isolates the error-involved CPU subsystem 1100 from the FT system 1001 without affecting the other CPU subsystem 1600 which operates normally.

The two CPU subsystems 1100 and 1600 perform the same operation (hereinafter, referred to as a "lock step") while being synchronized with each other on the clock basis. When one CPU subsystem fails, the FT controllers 1200 and 1700 logically isolate the failed CPU subsystem from the FT system 1001, so that the FT system 1001 maintains its operation by use of the other CPU subsystem.

When an IO device fails, it is possible to switch over the failed I/O device in accordance with software. When the I/O device 1310 fails, for example, the FT controller 1200 detects such a fault so as to send an error notice to the software (hereinafter, referred to as an "I/O device driver") controlling the I/O device 1310. Subsequently, the I/O device driver stops using the failed I/O device 1310 while utilizing another I/O device 1810, which is a counterpart of the failed I/O device 1310 in a duplex-redundancy configuration.

The two I/O subsystems 1300 and 1800 are classified into an active I/O subsystem and a standby I/O subsystem. In a normal operation mode, both of the I/O subsystems 1300 and 1800 are accessible. Upon occurrence of a fault, the FT controllers 1200 and 1700 isolate the filed I/O subsystem, which is switched with another I/O subsystem. This switching process is called a failover.

As described above, both the CPU subsystems 1100 and 1600 are involved in the same operation (i.e. the lock step) whilst both the I/O subsystems 1300 and 1800 are accessible. Upon receiving an I/O request (an I/O transaction) issued by the CPU subsystem 1100 or 1600 in one module, the FT controller 1200 or 1700 conducts routing with one of the I/O subsystems 1200 and 1800. An access to an I/O subsystem of the other module is made via a cross-link L1010 interconnecting between the FT controllers 1200 and 1700.

The FT controllers 1200 and 1700 include voters 1220 and 1720 which compare two I/O requests output from the CPU subsystem 1100 and 1600. The voters 1220 and 1720 monitor existence/nonexistence of an error by successively comparing I/O requests output from the CPU subsystems 1100 and 1600. When two I/O requests match with each other, it is considered that no error occurs; hence, each voter selectively outputs a single I/O request to a target I/O device.

FIG. 10 illustrates an exemplary operation in which the voter 1220 selectively outputs a single I/O request. In this illustration, the CPUs 1120 and 1620 perform the same lock step so as to simultaneously output their I/O requests. The I/O request of the CPU 1120 is forwarded to the router 1210 via the I/O hub 1130. Similarly, the I/O request of the CPU 1620 is forwarded to the router 1710 via the I/O hub 1630. In this situation, the module 1010 serves as an active module whilst the module 1060 serves as a standby module, wherein the routers 1210 and 1710 involved in the lock step simultaneously forward the I/O requests, having the same content, to the voters 1220.

Upon receiving the I/O requests from the routers 1210 and 1710, the voter 1220 selectively outputs a single I/O request to the "target" I/O device 1320. Subsequently, the I/O device 1320 sends back a response to the I/O request, which is divided into two pieces by the FT controller 1200. Two pieces of response are reversely sent back to the CPU subsystems 1120 and 1620.

Compared to generally-used computer systems, fault-tolerant systems are involved in some restrictions in terms of hardware configurations. In particular, fault-tolerant systems are limited in the number of supportable I/O devices.

Generally speaking, FT systems are each configured of a single LSI chip, namely an FT control LSI chip, so that all I/O requests output from CPU subsystems are transmitted via FT controllers. For this reason, the FT control LSI suffers from a bottleneck of I/O performance in response to the increasing number of I/O devices connected to each FT system. To improve I/O performance of each FT system, it is necessary to connect I/O paths, such as plenty of PCI-Express buses (i.e. serial interfaces standardized by PCI-SIG, wherein the following description refers to adoption of x16 PCI-Express having sixteen channels), to FT controllers, and a cross-link having a large bandwidth (e.g. a communication path) needs to be connected between modules. This needs numerous high-speed interfaces in each FT control LSI chip, thus enlarging the sale of integrated circuitry and increasing cost.

FIG. 11 shows a modified configuration of the FT system 1001 in which each module is equipped with a single FT control LSI chip. Specifically, FT control LSI chips 1200 and 1700, each constituting a single FT controller, are each equipped with three PCI-Express buses. In this case, sixteen channels are provided per each PCI-Express bus; hence, each FT control LSI needs high-speed interfaces with 16×3=48 channels in total. Generally speaking, each FT control LSI is connected with numerous I/O paths requiring numerous high-speed interfaces, which may increase the size of an LSI chip. LSI chips with large sizes suffer from a low yield in manufacturing and a very high manufacturing cost.

PRIOR ART DOCUMENT

Patent Document 1: Japanese Patent Application Publication No. 2006-172220

SUMMARY OF THE INVENTION

It is an object of the present invention to provide a low-cost configuration for a fault-tolerant system including a fault-tolerant controller connected with numerous I/O paths.

It is another object of the present invention to provide a fault-tolerant control method applied to the fault-tolerant system.

The present invention is directed to a fault-tolerant system including a plurality of modules each further including a CPU subsystem for outputting an I/O request, an I/O subsystem for carrying out an I/O operation in response to the I/O request, and a fault-tolerant control unit which is connected between the CPU subsystem and the I/O subsystem and which includes a master FT control LSI chip and at least one slave FT control LSI chip, wherein one module serves as an active module which is placed in an active state whilst another module serves as a standby module which is placed in a standby state.

Upon receiving fault information from the CPU subsystem or the I/O subsystem, the slave FT control LSI chip outputs status information, representing reception of the fault information, to the master FT control LSI chip. When the slave FT control LSI chip of the active module receives I/O requests, indicating the same content, from the CPU subsystem of the active module and the standby module with respect to the I/O subsystem of the active module, the slave FT control LSI chip selectively outputs one of I/O requests to the I/O subsystem. Subsequently, upon receiving a response from the I/O subsystem, the slave FT control LSI chip delivers the response to the CPU subsystem of the active module and the standby module. When the slave FT control LSI chip of the standby module receives an I/O request from the CPU subsystem of the standby module, the slave FT control LSI chip delivers the I/O request to the active module. Subsequently, upon receiving a response to the I/O request from the active module, the slave FT control LSI chip delivers the response to the CPU subsystem in the standby module.

Based on the status information output from the slave FT control LSI chip, the Master FT control LSI chip sends back a command for controlling isolation of a failed subsystem, which is either the CPU subsystem or the I/O subsystem, to the slave FT control LSI chip, allowing the slave FT control LSI chip to control isolation of the failed subsystem based on the command.

The present invention is directed to a master FT control LSI chip conducting fault-tolerant control on the fault-tolerant system. The master FT control LSI chip includes a SyncBus input portion that receives fault information output from the slave FT control LSI chip with respect to the fault-tolerant system, a master FT controller that determines a command for controlling isolation of a failed subsystem, which is found in the fault-tolerant system, based on the fault information, and a Sync Bus output portion that outputs the command to the fault-tolerant system.

The present invention is directed to a slave FT control LSI chip conducting fault-tolerant control on the fault-tolerant system. The slave FT control LSI chip includes a SyncBus output portion that delivers fault information, representing a failed subsystem found in the fault-tolerant system, to the master FT control LSI chip, and a slave FT controller that controls isolation of the failed subsystem based on a command which is sent back from the master FT controller in response to the fault information.

The present invention is directed to a fault-tolerant control method adapted to the fault-tolerant system. The fault-tolerant control method includes steps of receiving fault information from the CPU subsystem or the I/O subsystem with the slave FT control LSI chip; outputting, by the slave FT control LSI chip, status information, representing reception of the fault information, to the master FT control LSI chip; when the slave FT control LSI chip of the active module receives I/O requests, indicating the same content, from the CPU subsystem of the active module and the standby module with respect to the I/O subsystem of the active module, selectively outputting, by the slave FT control LSI chip, one of the I/O requests to the I/O subsystem; subsequently, upon receiving a response from the I/O subsystem, delivering, by the slave FT control LSI chip, the response to the CPU subsystem of the active module and the standby module; when the slave FT control LSI chip of the standby module receives an I/O request from the CPU subsystem of the standby module, delivering, by the slave FT control LSI chip, the I/O request to the active module; subsequently, upon receiving a response to the I/O request from the active module, delivering, by the slave FT control LSI chip, the response to the CPU subsystem in the standby module; and based on the status information output from the slave FT control LSI chip, sending back, by the master FT control LSI chip, a command for controlling isolation of a failed subsystem, which is either the CPU subsystem or the I/O subsystem, to the slave FT control LSI chip, allowing the slave FT control LSI chip to control isolation of the failed subsystem based on the command.

The present invention is able to constitute the FT control units, including FT control LSI chips connected with numerous I/O paths (e.g. I/O buses, I/O links, I/O devices), with a low manufacturing cost.

BRIEF DESCRIPTION OF THE DRAWINGS

These and other objects, aspects, and embodiments of the present invention will be described in more detail with reference to the following drawings.

FIG. 5 shows examples of commands which are transmitted from the master FT controller to the slave FT controller.

FIG. 6 shows exemplary contents of status information transmitted from the slave FT control LSI chip to the master FT control LSI chip.

FIG. 7 shows a data structure of a duplex-redundancy packet output from the master FT control LSI chip.

DESCRIPTION OF THE PREFERRED EMBODIMENT

The present invention will be described in further detail by way of examples with reference to the accompanying drawings.

The preferred embodiment of the present invention will be described with reference to FIGS. 1 to 8, wherein the embodiment refers to a fault-tolerant server (or an FT server) which is an example of a fault-tolerant system (or an FT system) of the present invention. The fault-tolerant server is a server equipped with a fault-tolerant function, wherein a single server is multiplexed using a plurality of modules. An example of the fault-tolerant server is a PC server with a fault-tolerant function.

In this connection, the present invention is not necessarily limited to the fault-tolerant server, hence, the present invention is applicable to various types of fault-tolerant systems such as a fault-tolerant system adopting mutual communication between computers serving as modules and a fault-tolerant computer precluding a server function.

Figure 1:
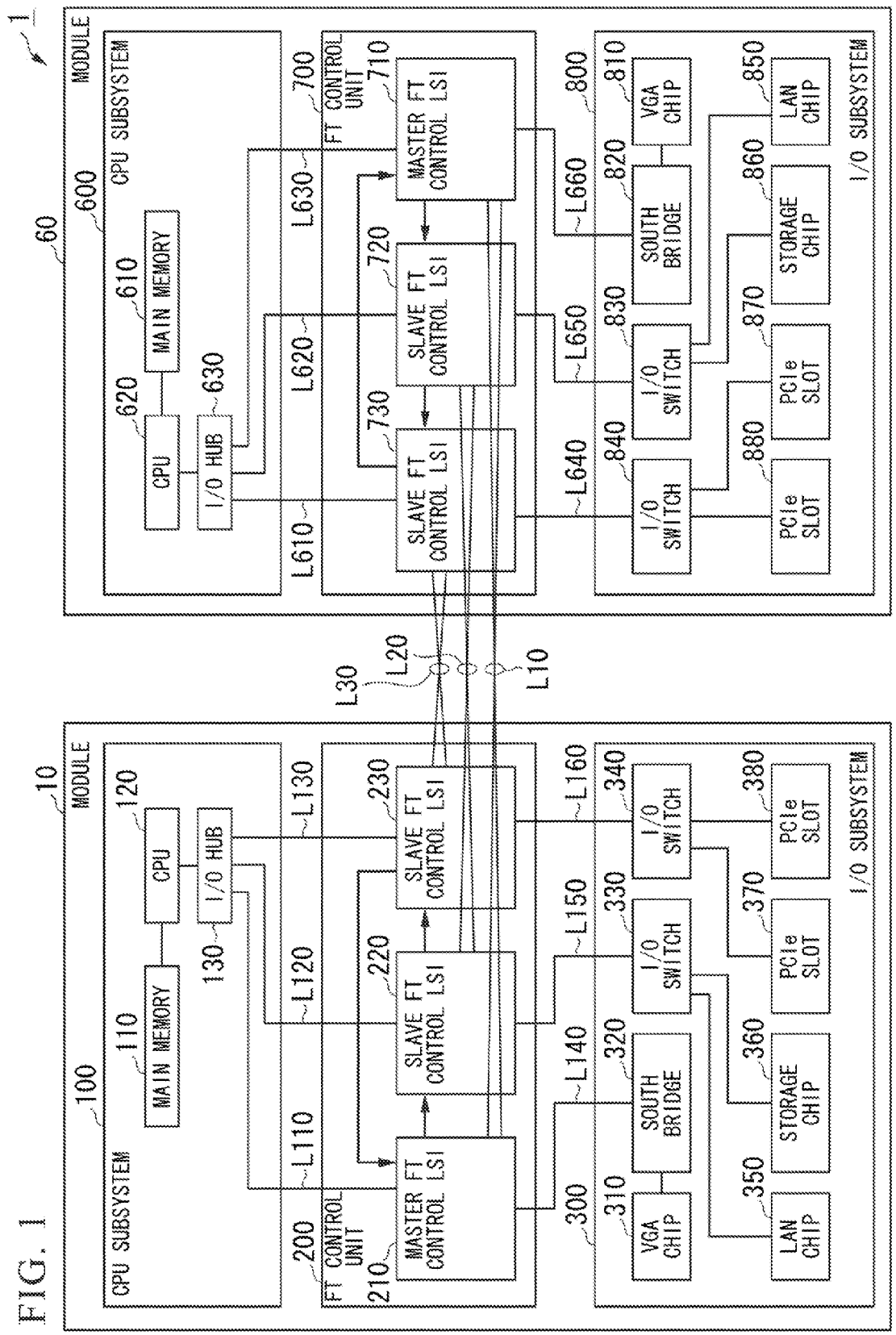
FIG. 1 is a block diagram showing the constitution of a fault-tolerant server according to a preferred embodiment of the present invention with two modules each including a CPU subsystem, a fault-tolerant control unit, and an I/O subsystem.

FIG. 1 is a block diagram showing the constitution of a fault-tolerant server (or an FT server) 1 according to the embodiment of the present invention. The FT server 1 includes two modules 10, 60. The module 10 includes a CPU subsystem 100, a fault-tolerant control unit (or an FT control unit) 200, and an I/O subsystem 300. Similarly, the module 60 includes a CPU subsystem 600, an FT control unit 700, and an I/O subsystem 800.

The CPU subsystem 100 includes a CPU 120, a main memory 110 connected to the CPU 120, and an I/O hub 130 for routing an I/O request to the I/O subsystem 300. The I/O hub 130 is connected to the FT control unit 200 by way of three PCI-Express busses L110, L120, L130.

Similarly, the CPU subsystem 600 includes a CPU 620, a main memory 610 connected to the CPU 620, and an I/O hub 630 for routing an I/O request to the I/O subsystem 800. The I/O hub 630 is connected to the FT control unit 700 by way of three PCI-Express busses L610, L620, L630.

The scope of the present invention is not necessarily limited to the FT system including CPU subsystems shown in FIG. 1. For instance, each CPU subsystem may serve as a multiprocessor subsystem having a plurality of CPUs.

The FT control unit 200, which is connected with the CPU subsystem 100 via three PCI-Express buses L110-L130, includes one master FT control LSI chip and two or more slave FT control LSI chips. FIG. 1 shows the FT control unit 200 including one master FT control LSI chip 210 and two slave FT control chips 220, 230. Similarly, the FT control unit 700 includes one master FT control LSI chip 710 and two slave FT control LSI chips 720, 730.

The master FT control LSI chip 210 is connected to the CPU subsystem 100 via one PCI-Express bus L110 and connected to a south bridge 320 of the I/O subsystem 300 via one PCI-Express bus L140. Additionally, the master FT control LSI chip 210 is connected to its counterpart master FT control LSI chip 710 via a cross-link L10.

The slave FT control LSI chip 220 is connected to the CPU subsystem 100 via one PCI-Express bus L120 and connected to an I/O switch 330 of the I/O subsystem 300 via one PCI-Express bus L150. Additionally, the slave FT control LSI chip 220 is connected to its counterpart slave FT control LSI chip 720 via a cross-link L20.

The slave FT control LSI chip 230 is connected to the CPU subsystem 100 via one PCI-Express bus L130 and connected to an I/O switch 340 of the I/O subsystem 300 via one PCI-Express bus L160. Additionally, the slave FT control LSI chip 230 is connected to its counterpart slave FT control LSI chip 730 via a cross-link L30.

Each module includes one master FT control LSI chip, which determines a command (or a control instruction) for performing isolation control on a failed subsystem based on status information output from the slave FT control LSI chip, thus outputting the command to the slave FT control LSI chip.

The master FT control LSI chip may serve as an FT control LSI chip. Specifically, when the I/O subsystem, coupled with the master FT control LSI chip, is placed in an active state, one of I/O requests, both indicating the same content, output from the CPU subsystem, coupled with the master FT control LSI chip, and another module is delivered to the I/O subsystem coupled with the master FT control LSI chip. Subsequently, a response to the I/O request from the I/O subsystem is delivered to the CPU subsystem, coupled with the master FT control LSI chip, and another module. In contrast, when the I/O subsystem, coupled with the master FT control LSI chip, is placed in a standby state, one of I/O requests output from the CPU subsystem coupled with the master FT control LSI chip is delivered to another module. Subsequently, a response to the I/O request from another module is delivered to the CPU subsystem coupled with the master FT control LSI chip.

In a normal operation mode, the slave FT control LSI chip is able to function as the FT control LSI chip by itself alone. In an abnormal operation mode entailing occurrence of an error or a deviation from a lock step, the slave FT control LSI chip operates in accordance with a command from the master FT control LSI chip.

Specifically, when the I/O subsystem coupled with the slave FT control LSI chip is placed in an active state, one of I/O requests, both indicating the same content, output from the CPU subsystem coupled with the slave FT control LSI chip and another module is delivered to the I/O subsystem coupled with the slave FT control LSI chip. Subsequently, a response to the I/O request from the I/O subsystem is delivered to the CPU subsystem coupled with the slave FT control LSI chip and another module. In contrast, when the I/O subsystem coupled with the slave FT control LSI chip is placed in a standby state, one of I/O requests output from the CPU subsystem coupled with the slave FT control LSI chip is delivered to another module. Subsequently, a response to the I/O request from another module is delivered to the CPU subsystem coupled with the slave FT control LSI chip.

When fault information is output from the CPU subsystem or the I/O subsystem, which is coupled with the slave FT control LSI chip, the slave FT control LSI chip outputs status information, representing acquisition of fault information, to the master FT control LSI chip. Additionally, the slave FT control LSI chip controls isolation of a failed subsystem based on a command output from the master FT control LSI chip.

FIG. 1 shows that one FT control unit is equipped with two slave FT control LSI chips, whereas it is possible to increase the number of slave FT control LSI chips in response to the number of I/O devices.

The I/O subsystem 300 includes a VGA (Video Graphics Array) chip 310 (which is an LSI chip used for displaying an image on screen), a south bridge 320 which is involved in I/O control with a USB and a legacy device (e.g. PS/2), a LAN (Local Area Network) chip 350 (which controls communication between LANs), a storage chip 360 (which performs read/write control on a storage device such as a hard disk drive (HDD)), and PCIe slots 370, 380 (or PCI-Express slots used for extension of PCI-Express). Additionally, the I/O subsystem further includes an I/O switch 330 used for routing of signals between the FT control unit 200, the LAN chip 350, and the storage chip 360, and an I/O switch 340 used for routing signals between the FT control unit 200, and the PCIe slots 370, 380. Similarly, the I/O subsystem 800 includes a VGA chip 810, a south bridge 820, I/O switches 830, 840, a LAN switch 850, a storage switch 860, and PCIe slots 870, 880.

In this connection, the scope of the present invention is not necessarily limited to the FT system including the I/O subsystem shown in FIG. 1. I/O devices connected to the FT system are not necessarily limited to those shown in FIG. 1. The number of I/O devices is not necessarily limited to the number of I/O devices arranged in the I/O subsystem shown in FIG. 1. It is possible to cope with numerous I/O devices by increasing the number of slave FT control LSI chips.

In a normal operation mode, both the I/O subsystems 300 and 800 are placed in an accessible state. Initial setting determines that one I/O subsystem be placed in an active state while the other be placed in a standby state.

When the I/O subsystem 300 is placed in an active state whilst the I/O subsystem 800 is placed in a standby state, for example, I/O devices of the I/O subsystem 300 are utilized in the normal operation mode. When a fault occurs in the I/O subsystem 300, the I/O subsystem 800 is placed in an active state. Subsequently, the failed I/O subsystem 300 is logically isolated from the FT system 1 under control of the FT control unit 200.

Figure 2:
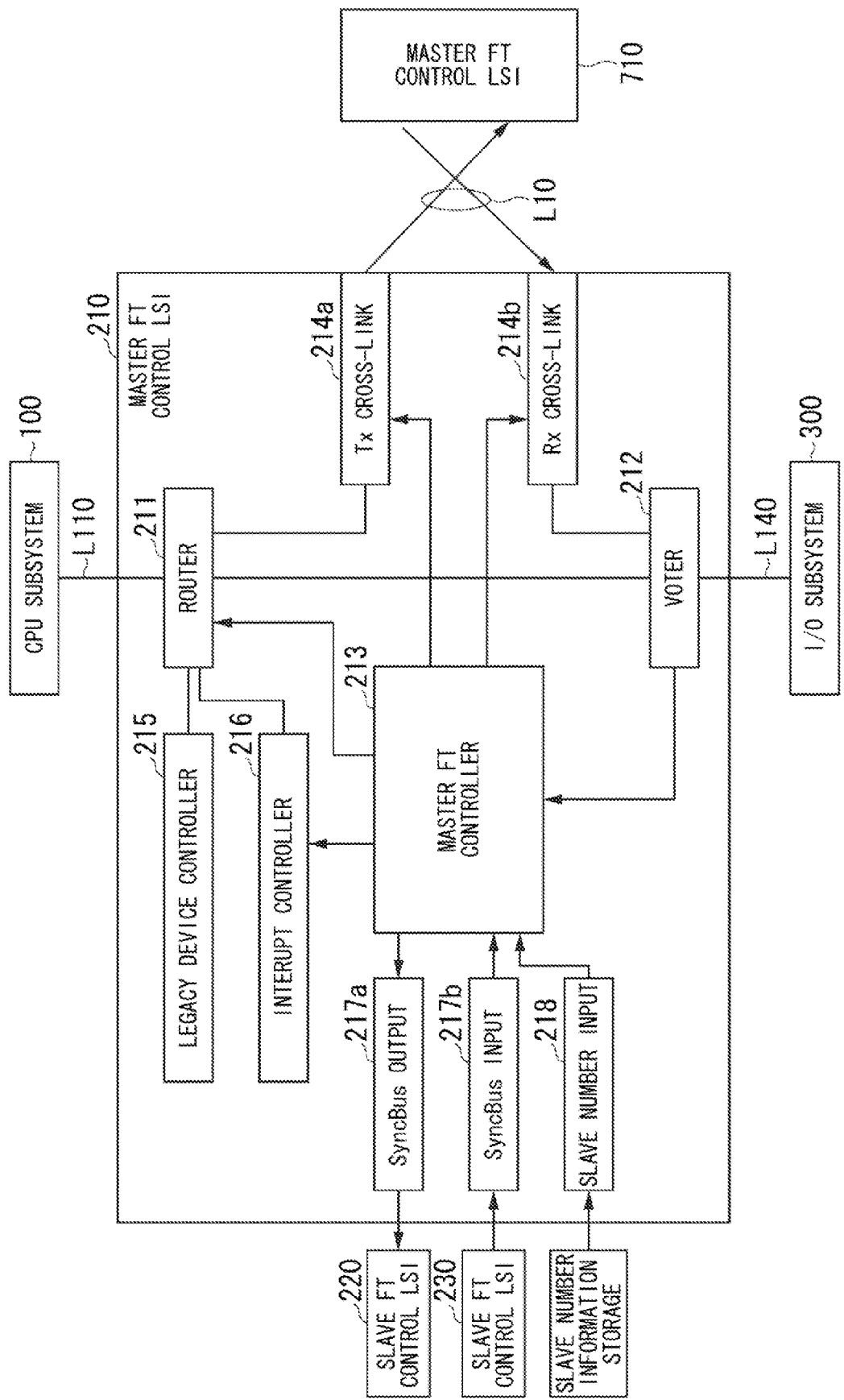
FIG. 2 is a block diagram showing the constitution of a master FT control LSI chip included in the fault-tolerant control unit.

FIG. 2 is a block diagram showing the detailed constitution of the master FT control LSI chip 210. The master FT control LSI chip 210 includes a router 211, a voter 212, a master FT controller 213, a Tx cross-link 214a, an Rx cross-link 214b, a legacy controller 215, an interrupt controller 216, a SyncBus output terminal 217a, a SyncBus input terminal 217b, and slave number input terminal 218.

The router 211 determines a destination as to whether an I/O request output from the CPU subsystem 100 is delivered to the I/O subsystem of the module 10 or the I/O subsystem 800 of the other module 60. The router 211 determines the destination of an I/O request based on the status of the I/O subsystems which are placed in an active state and a standby state.

The voter 212 determines whether an I/O request output from the CPU subsystem 100 of the module 10 agrees or disagrees with an I/O request output from the CPU subsystem 600 of the other module 60. The voter 212 accepts error information (or fault information notifying occurrence of a fault) from the CPU subsystem 100 or the I/O subsystem 300 in the module 10.

The master FT controller 213 determines whether or not to make a switch between the active I/O subsystem and the standby I/O subsystem and whether or not to isolate the CPU subsystem 100 or the I/O subsystem 300 from the module 10 based on an agree/disagree decision result of the voter 212, agree/disagree decision results output from the slave FT control LSI chips 220 and 230 via SyncBus, and error information output from the voter 212, or the slave FT control LSI chips 220, 230. Based on these decision results, the master FT controller 213 performs an isolation process with respect to the CPU subsystem 100 or the I/O subsystem 300. Additionally, the master FT controller 213 outputs its command, based on these decisions, to the slave FT control LSI chips 220, 230 via the SyncBus output terminal 217a.

The master FT controller 213 controls the router 211, the voter 212, and the Tx cross-link 214a such that an I/O request output from the CPU subsystem is delivered to the "active" I/O subsystem while its response is delivered to the "active" CPU subsystem.

The Tx cross-link 214a is connected to the master FT control LSI chip 710 via the cross-link L10, thus allowing the router 211 to deliver an I/O request to the master FT control LSI chip 710 under control of the master FT controller 213. The Rx cross-link 214b is connected to the master FT control LSI chip 710 via the cross-link L10, thus allowing the master FT control LSI chip 710 to deliver its transaction to the router 211.

The SyncBus output terminal 217a is a signal output terminal that outputs a command of the master FT controller 213 to the slave FT control LSI chip 220 via SyncBus. The SyncBus input terminal 217b is a signal input terminal that inputs status information from the slave FT control LSI chip 230 via SyncBus so as to forward the status information to the master FT controller 213.

The slave number input terminal 218 is a signal input terminal (e.g. a strap pin) receiving a signal, representing the number of slave FT control LSI chips connected to the master FT control LSI chip, via SyncBus, wherein the received signal is forwarded to the master FT controller 213. In the present embodiment, the master FT control LSI chip 210 is connected with the two slave FT control LSI chips 220, 230, so that a signal representing the number "2" is forwarded to the slave number input terminal 218. In this connection, an administrator of the FT server 1 is allowed to set the number of slave FT control LSI chips by way of initial setting.

The legacy device controller 215 controls a legacy device which is connected to the south bridge 320. Additionally, the legacy device controller 215 performs an interrupt process based on a legacy IRQ (i.e. an old-style interrupt signal regarding "Legacy Interrupt Request") output from a specific device of the I/O subsystem. The interrupt controller 216 performs an interrupt process based on the other interrupt signal, other than the legacy IRQ, output from a specific device of the I/O subsystem.

One module needs to incorporate one legacy device controller and one interrupt controller therein. For this reason, the master FT control LSI chip is designed to incorporate the legacy device controller and the interrupt controller, thus preventing duplication of the legacy device controller and the interrupt controller in one module.

The master FT control LSI chip 710 has the same constitution as the master FT control LSI chip 210; hence, its description will be omitted.

Figure 3:
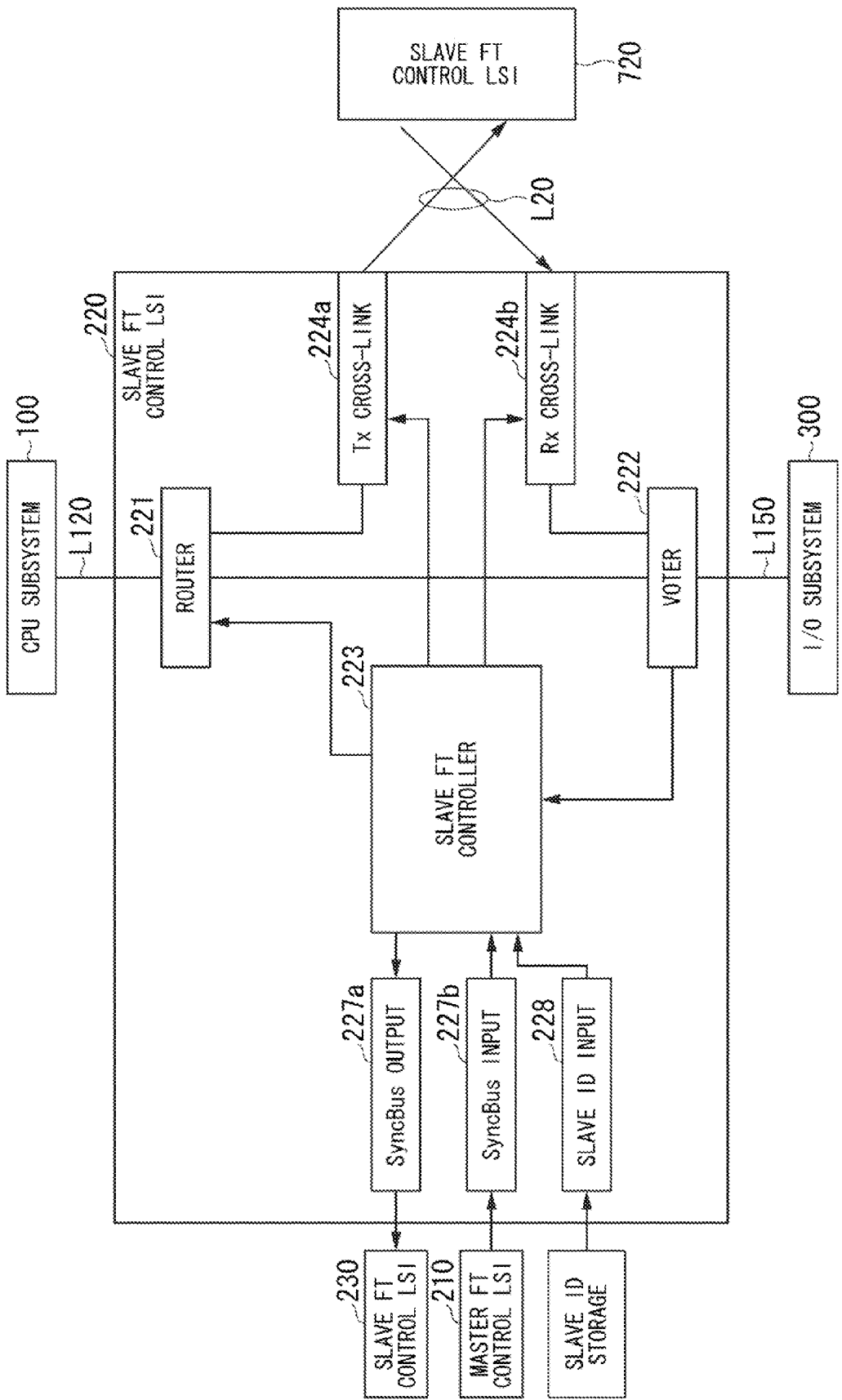
FIG. 3 is a block diagram showing the constitution of a slave FT control LSI chip included in the fault-tolerant control unit.

FIG. 3 is a block diagram showing the constitution of the slave FT control LSI chip 220. The slave FT control LSI chip 220 includes a router 221, a voter 222, a slave FT controller 223, a Tx cross-link 224*a*, and an Rx cross-link 224*b*. The router 221 has the same function as the router 211 (see FIG. 6); hence, its description will be omitted. The voter 222 has the same function as the voter 212; hence, its description will be omitted.

The slave FT controller 223 forwards error information and an agree/disagree decision result of the voter 222 to the master FT control LSI 210 via SyncBus. Additionally, the slave FT controller 223 receives and executes a command of the master FT control LSI chip 210. Furthermore, the slave FT controller 223 rewrites duplex-redundancy packets (which will be discussed later), output from the master FT control LSI chip 210 via a SyncBus input terminal 227*b*, so as to forward the rewritten command to a SyncBus output terminal 227*a*.

The Tx cross-link 224*a* is connected to the slave FT control LSI 720 via the cross-link L20, so that the router 221 delivers an I/O request to the slave FT control LSI chip 720 under control of the slave FT controller 223. The Rx cross-link 224*b* is connected to the slave FT control LSI chip 720 via the cross-link L20, so that an I/O request output from the slave FT control LSI chip 720 is delivered to the router 221.

The SyncBus input terminal 227*b* is a signal input terminal that inputs duplex-redundancy packets output from the master FT control LSI chip 210 via SyncBus, so that the received command is forwarded to the master FT controller 223. The SyncBus output terminal 227*a* is a signal output terminal that outputs rewritten duplex-redundancy packets, output from the slave FT controller 223, to the slave FT control LSI chip 230 via SyncBus.

A slave ID input terminal 228 is a signal input terminal that inputs a slave ID, which is an indicator identifying the slave FT control LSI chip 220, so that the input signal thereof is forwarded to the slave FT controller 223. For instance, an administrator of the FT server 1 is allowed to set the slave ID by way of initial setting. In this connection, the slave ID includes order information representing an order of transmission via SyncBus, wherein "1" is set to the slave FT control LSI chip 220, and "2" is set to the slave FT control LSI chip 230.

The slave FT control LSE chip 220 differs from the master FT control LSI chip 210 in that the slave FT control LSI chip 220 does not include the legacy device controller and the interrupt controller, and the slave FT control LSI chip 220 does not determine whether or not to isolate the CPU subsystem 100 or the I/O subsystem 300 from the module 10.

All the slave FT control LSI chips 230, 720, 730 have the same constitution as the slave FT control LSI chip 220; hence, their descriptions will be omitted.

In this connection, it is possible to manufacture FT control LSI chips which can be used for either master FT control LSI chips or slave FT control LSI chips, whereby FT control LSI chips are installed in modules to implement functions of master/slave FT control LSI chips. For instance, FT control LSI chips are equipped with mode switches each making a switch between a master mode and a slave mode. The master mode validates specific functions dedicated to the master FT control LSI chip, such as the legacy device controller and the interrupt controller, whilst the slave mode invalidates specific functions dedicated to the master FT control LSI chip. FT control LSI chips having the same constitution are easy to design and manufacture by use of a single model of LSI and effective to implement functions of master/slave FT control LSI chips. This alleviates engineers' loads in designing LSI chips and improves a manufacturing efficiency.

Figure 4:
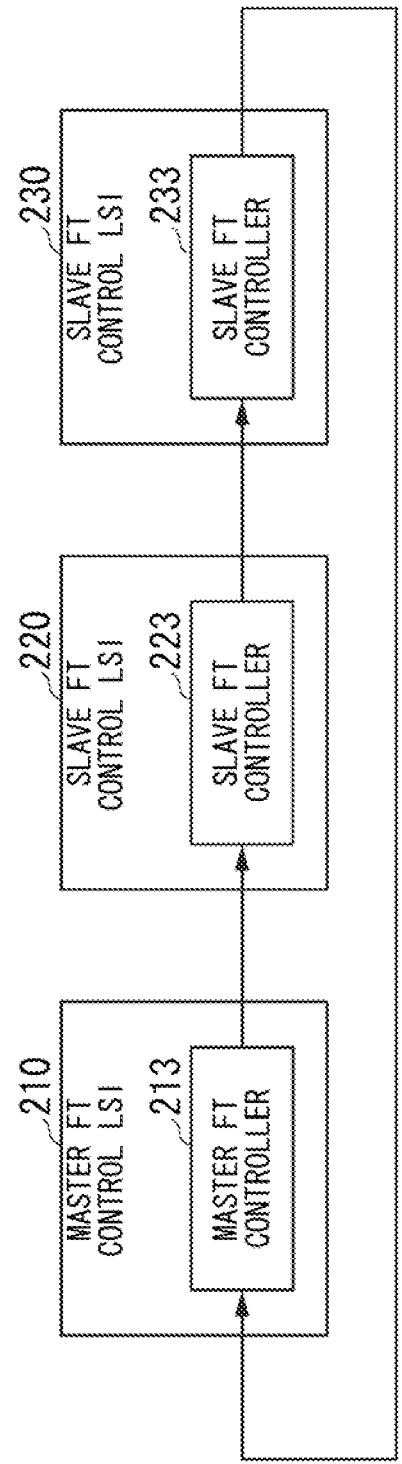
FIG. 4 is a SyncBus connection diagram showing a ring-type connection between a master FT controller and slave FT controllers.

FIG. 4 is a SyncBus connection diagram showing a ring-type connection between the master FT controller 213 and the slave FT controllers 223, 233. This ring-type connection serves as a daisy chain in which a command (output from the master FT controller 213) circulates between the master FT controller 213, the slave FT controller 223, and the slave FT controller 233 in a sequential order, and a daisy chain in which an agree/disagree decision result and error information (which are output from the slave FT controller 223 or 233 to the master FT controller 213) circulate between the slave FT controller 223, the slave FT controller 233, and the master FT controller 213 in a sequential order.

Owing to the ring-type connection of SyncBus, each of master/slave FT control LSI chips needs one SyncBus output terminal and one SyncBus input terminal irrespective of the number of slave FT controllers included in one FT control unit. This makes it easy to change the number of slave FT control LSI chips; hence, it is possible to flexibly change the number of interfaces installed in each FT control unit.

In this connection, the SyncBus connection is not necessarily limited to the ring-type connection; hence, it is possible to employ various types of connections securing transmission of instructions and data between the master Ft controller 213 and the slave FT controllers 223, 233. For instance, it is possible to employ a star-type connection about the master FT controller 213. The star-type connection may increase a speed of transmitting data between the master FT controller and the slave FT controller.

FIG. 5 shows examples of commands which are transmitted from the master FT control LSI chip to the slave FT control LSI chip.

In FIG. 5, "NULL" is a command indicating no instruction, which is provided in a normal operation mode when no instruction needs to be implemented. "Shoot CPU" is a command indicating an isolation of a CPU subsystem, which is provided when an error is detected in the CPU subsystem of the module. "Shoot IO" is a command indicating an isolation of an I/O subsystem, which is provided when an error is detected in the I/O subsystem of the module.

"Bring-up CPU" is a command indicating built-in of a CPU subsystem, which is provided when the FT server 1 starts its operation. "Bring-up IO" is a command indicating built-in of an I/O subsystem, which is provided when the FT server 1 starts its operation.

"Go CPU SMR" is a command indicating an isolation of a CPU subsystem of a counterpart module, which is provided when an error is detected in the CPU subsystem of the counterpart module. "Go IO SMR" is a command indicating an isolation of an I/O subsystem of a counterpart module, which is provided when an error is detected in the I/O subsystem of the counterpart module.

"Voter Wait" is a command indicating a temporary stoppage of a voter, which is provided when an error is detected in a CPU subsystem due to a deviation of the lock step, thus temporarily stopping the operation of the voter until a fault position is specified.

FIG. 6 is a table showing examples of status information which the slave FT control LSI chip outputs to the master FT control LSI chip.

In FIG. 6, "DMR" is status information indicating that the CPU subsystem and the I/O subsystem are placed in a duplex-redundancy state, name a DMR (Double Module Redundancy), which is provided in the normal operation mode.

"CPU SMR" is status information indicating that the CPU subsystem is placed in a single-redundancy state, namely SMR (Single Module Redundancy), whilst the I/O subsystem is placed in a duplex-redundancy state, which is provided when the CPU subsystem of the counterpart module is isolated.

"IO SMR" is status information indicating that the CUP subsystem is placed in a duplex-redundancy state whilst the I/O subsystem is placed in a single-redundancy state, which is provided when the I/O subsystem of the counterpart module is isolated.

"SMR" is status information indicating that the CPU subsystem and the I/O subsystem are placed in a single-redundancy state, which is provided when the CPU subsystem and the I/O subsystem of the counterpart module are isolated.

"CPU Broken" is status information indicating that the CPU subsystem of the module is isolated whilst the I/O subsystem is placed in a duplex-redundancy state, which is provided when the CPU subsystem of the module is isolated.

"I/O Broken" is status information indicating that the CPU subsystem is placed in a duplex-redundancy state whilst the I/O subsystem of the module is isolated, which is provided when the I/O subsystem of the module is isolated.

"Broken" is status information indicating that the CPU subsystem and the I/O subsystem of the module are isolated, which is provided when the CPU subsystem and the I/O subsystem of the module are isolated.

"CPU Error" is status information indicating that an error is detected in the CPU subsystem, which is provided when an error is detected in the CPU subsystem.

"IO Error" is status information indicating that an error is detected in the I/O subsystem, which is provided when an error is detected in the I/O subsystem.

"Unk Error" is status information indicating that an error is detected but an erroneous position cannot be specified, which is provided when an error is detected at an unspecified erroneous position.

"DMR Violate" is status information indicating a deviation from a duplex-redundancy state, i.e. a step-out event out of the lock step, which is provided when a deviation is detected between an I/O request of the module and another I/O request of the counterpart module.

FIG. 7 shows a data structure of a duplex-redundancy packet output from the master FT control LSI chip. The duplex-redundancy packet of FIG. 7 includes a MasterCount field, a Num field, an Item#1 field, . . . , an Item#n field.

The MasterCount field stores a count value allowing for synchronous operation between slave FT control LSI chips. In the present embodiment, duplex-redundancy packets output from the master FT control LSI chip are transmitted via Sync Bus with a daisy chain structure, so that duplex-redundancy packets may reach the "far-side" slave FT control LSI chip (i.e. the slave FT control LSI chip which is distant from the master FT control LSI chip via a relatively large number of slave FT control LSI chips interposed therebetween) at a delayed timing. In the case of FIG. 4, for example, duplex-redundancy packets output from the master FT control LSI chip 210 will be delayed in the "far-side" slave FT control LSI chip 230 rather than the "near-side" slave FT control LSI chip 220.

To secure synchronous operation between the slave FT control LSI chips 220 and 230, the master FT control LSI chip 210 writes a count value, indicating a command-execute timing, into the MasterCount field. In the present invention, the master FT control LSI chip outputs a duplex-redundancy packet to the slave FT control LSI chip while writing a count value into the MasterCount field. Waiting for the timing that a duplex-redundancy packet reliably reaches all the slave FT control LSI chips, the slave FT control LSI chips start to execute commands. For instance, the slave FT control LSI chip executes its command when "current count value"="count value of MasterCount field"+"time necessary for transmission of data between LSIs"×"number of slave FT control LSI chips".

The Num field stores the number of slave FT control LSI chips installed in one FT control unit. In the present embodiment, the FT control unit 200 includes two slave FT control LSI chips, namely 220 and 230; hence, "2" is stored in the Num field. The master FT controller 213 has already obtained slave number information representing the number of slave FT control LSI chips via the slave number input terminal 218, so that the number of slave FT control LSI chips is stored in the Num field.

The "n" fields, i.e. Item#1 field to the Item#n field, store commands assigned to slave FT control LSI chips, wherein the number "n" is a positive integer representing the number of slave FT control LSI chips. In the present embodiment, the FT control unit 200 includes two slave. FT control LSI chips, namely 220 and 230, so that the duplex-redundancy packet includes two fields, namely Cmd#1 and Cmd#2.

The duplex-redundancy packet output from the master FT control LSI chip is partially rewritten by the slave FT controller and then sent back to the master FT control LSI chip. Herein, the MasterCount field and the Num field, included in the duplex-redundancy packet, are not changed from their original values included in the original duplex-redundancy packet.

In this connection, the master FT controller may determine existence or nonexistence of an error in the slave FT control LSI chip based on the value of the MasterCount field. For instance, the master FT controller makes a decision, based on the value of the MasterCount field, as to whether or not duplex-redundancy packets are sent back in an original order of transmission. When duplex-redundancy packets are not sent back in the original order of transmission, or when at least one duplex-redundancy is missed without being sent back, the master FT controller determines that an error may occur in any one of slave FT control LSI chips, thus making an error indication for an administrator of the FT server 1.

On the other hand, the slave FT control LSI chip rewrites the contents of the Item#1 to Item#n fields with the status information shown in FIG. 6. Upon receiving a duplex-redundancy packet, the slave FT control LSI chip reads a command stored in the Item#i field (where "i" denotes the serial number of the slave FT control LSI chip counted from the master FT control LSI chip, where i is a positive integer in 1≤i≤n), rewrites the content of the Item#i field, and then forwards the duplex-redundancy packet to the next slave FT control LSI chip. Therefore, the duplex-redundancy packet, which is sent back to the master FT control LSI chip, reflects the status information with respect to all the slave FT control LSI chips.

When No. i slave FT control LSI chip detects an error or a step-out event of the CPU subsystem, status information representing it is written into the Item#i field of the duplex-redundancy packet and is notified to the master FT control LSI chip.

As described above, the master FT control LSI chip sends information, representing commands and synchronization timing, to the slave FT control LSI chip, whilst the slave FT control LSI chip sends back status information to the master FT control LSI chip, thus implementing fault-tolerant control between the master FT control LSI chip and the slave FT control LSI chip. Since the FT control unit is constituted using a plurality of small-size LSI chips, it is possible to reduce manufacturing cost. Since the FT control unit is able to increase the number of slave FT control LSI chips while increasing the number of I/O ports, it is possible to flexibly extend I/O functionality.

Next, a fault-tolerant control process implemented by the FT server 1 will be described with reference to FIG. 8.

Figure 8:
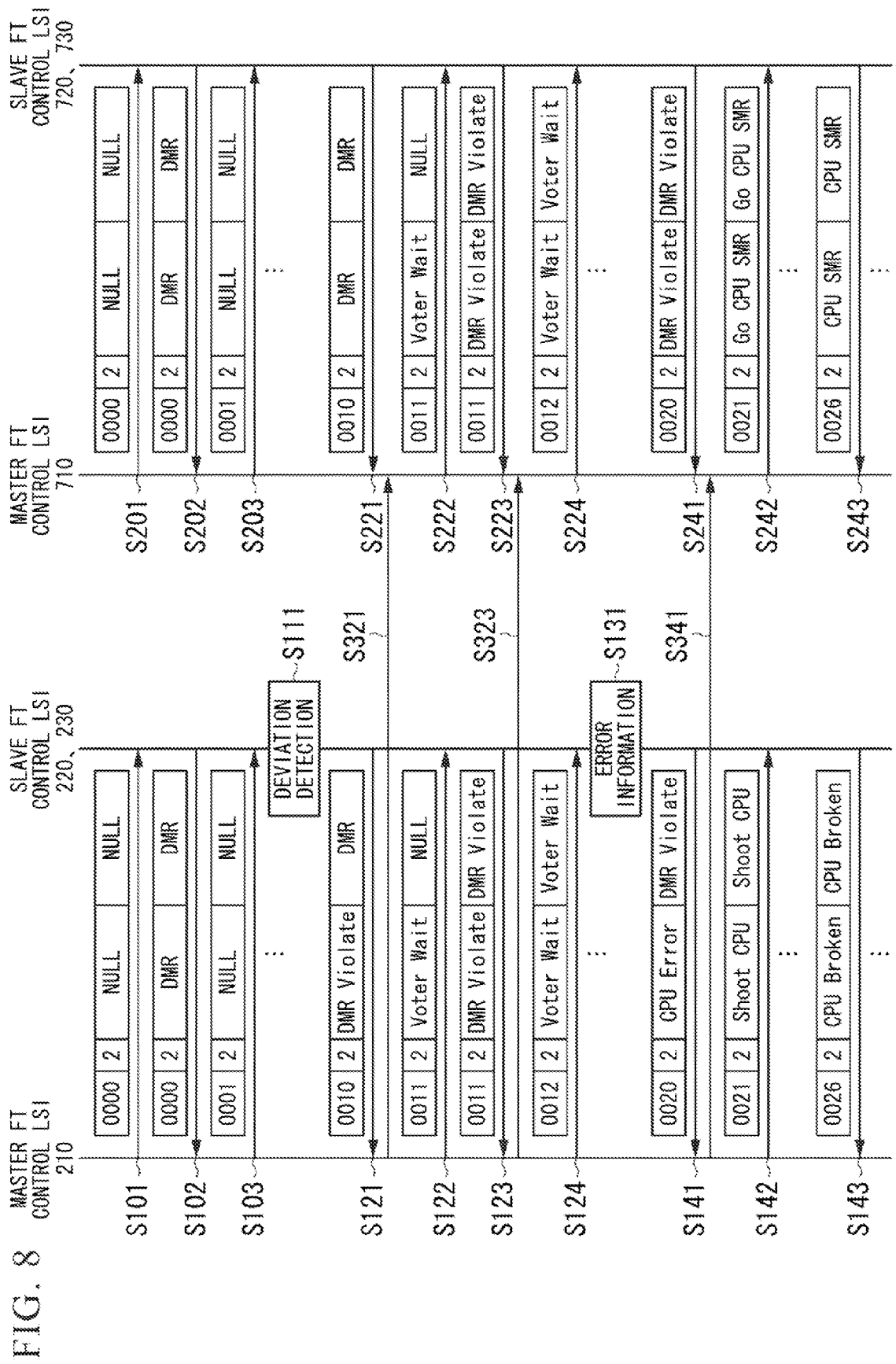
FIG. 8 is sequence diagram showing a fault-tolerant control process implemented by the fault-tolerant server.
Figure 9:
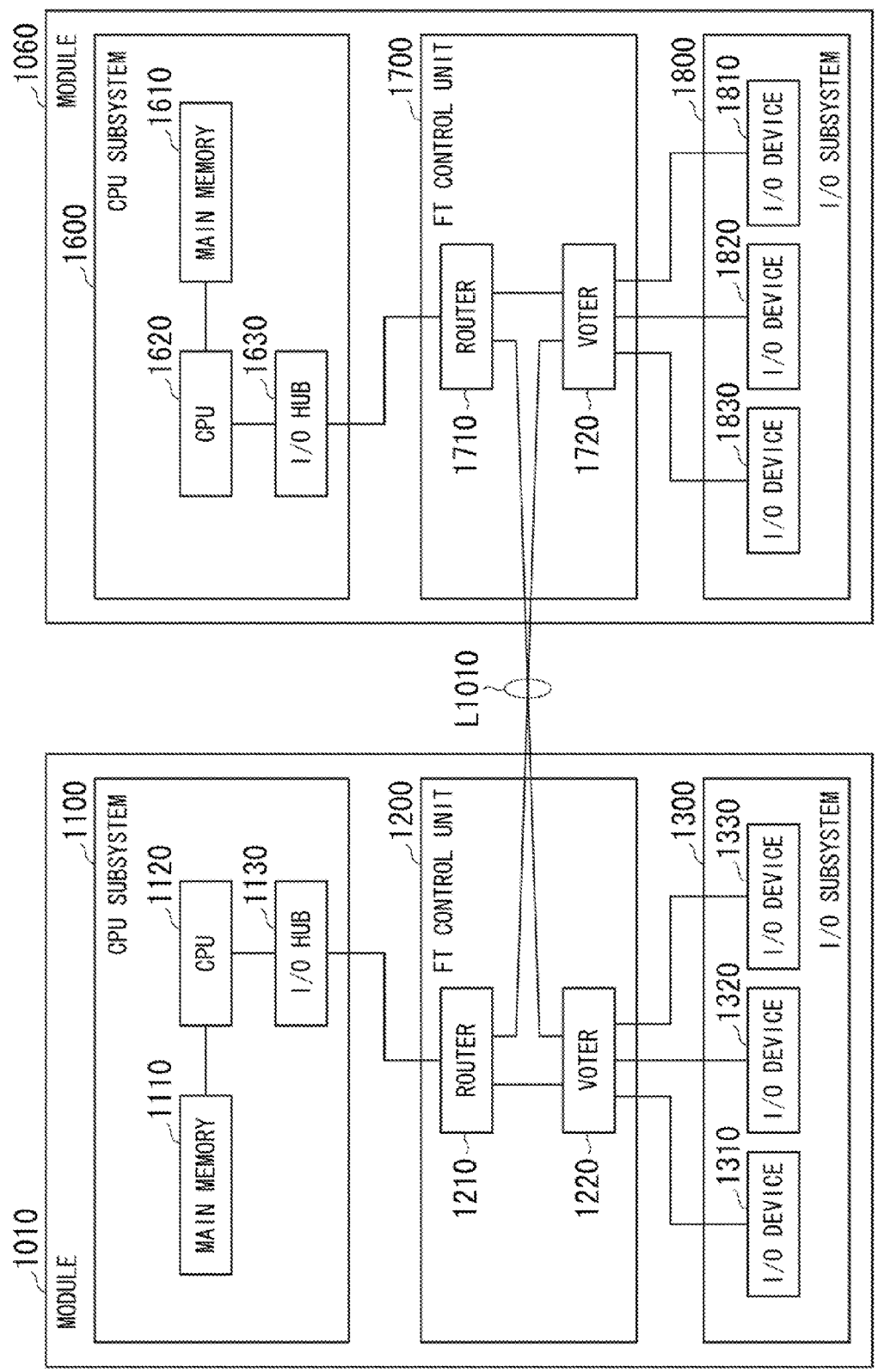
FIG. 9 is a block diagram showing the basic configuration of a fault-tolerant system including duplex modules each configured of a CPU subsystem, a fault-tolerant control unit, and an I/O subsystem.
Figure 10:
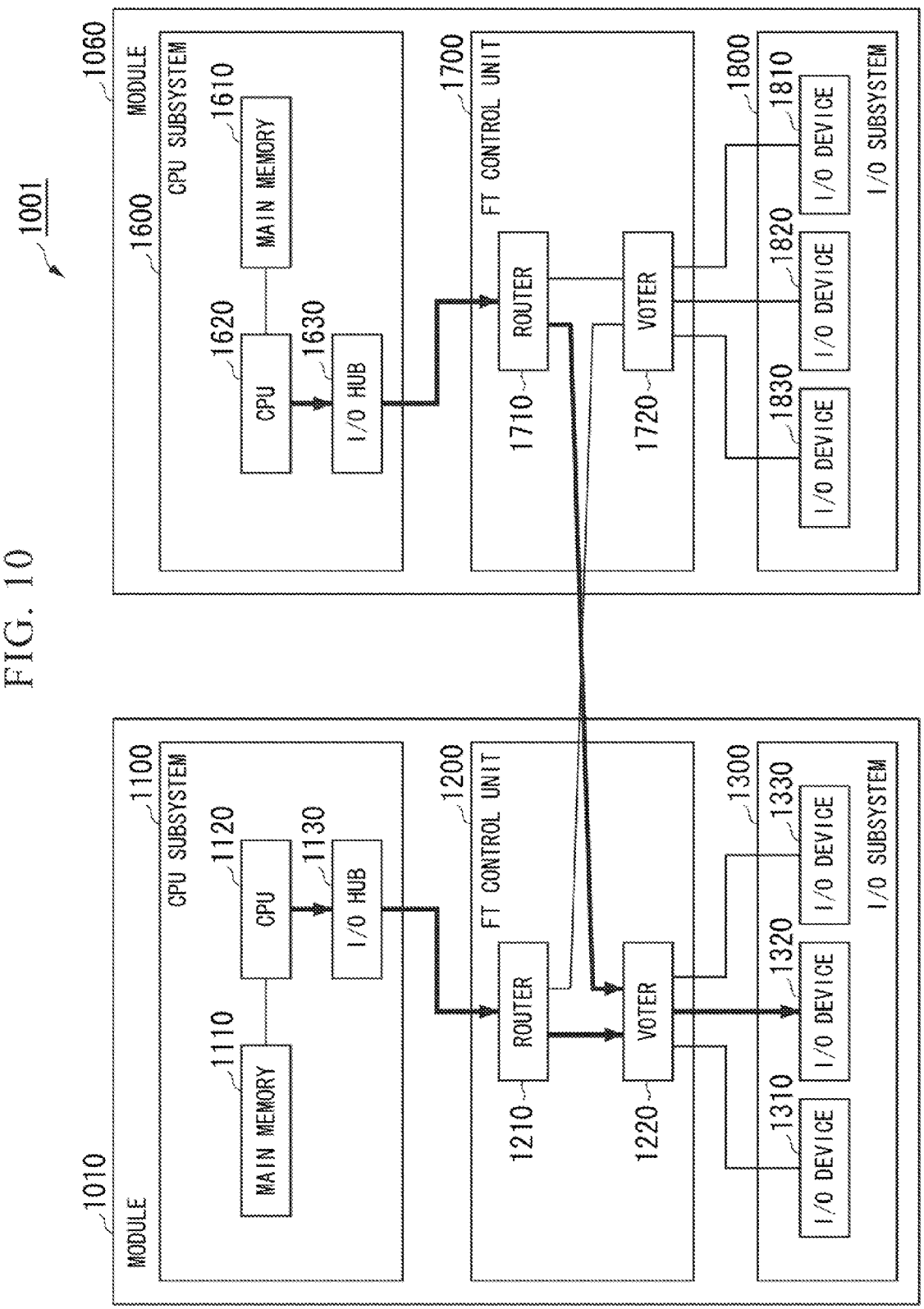
FIG. 10 is a block diagram illustrating the operation of a voter for selectively outputting a single I/O request in a fault-tolerant control unit.
Figure 11:
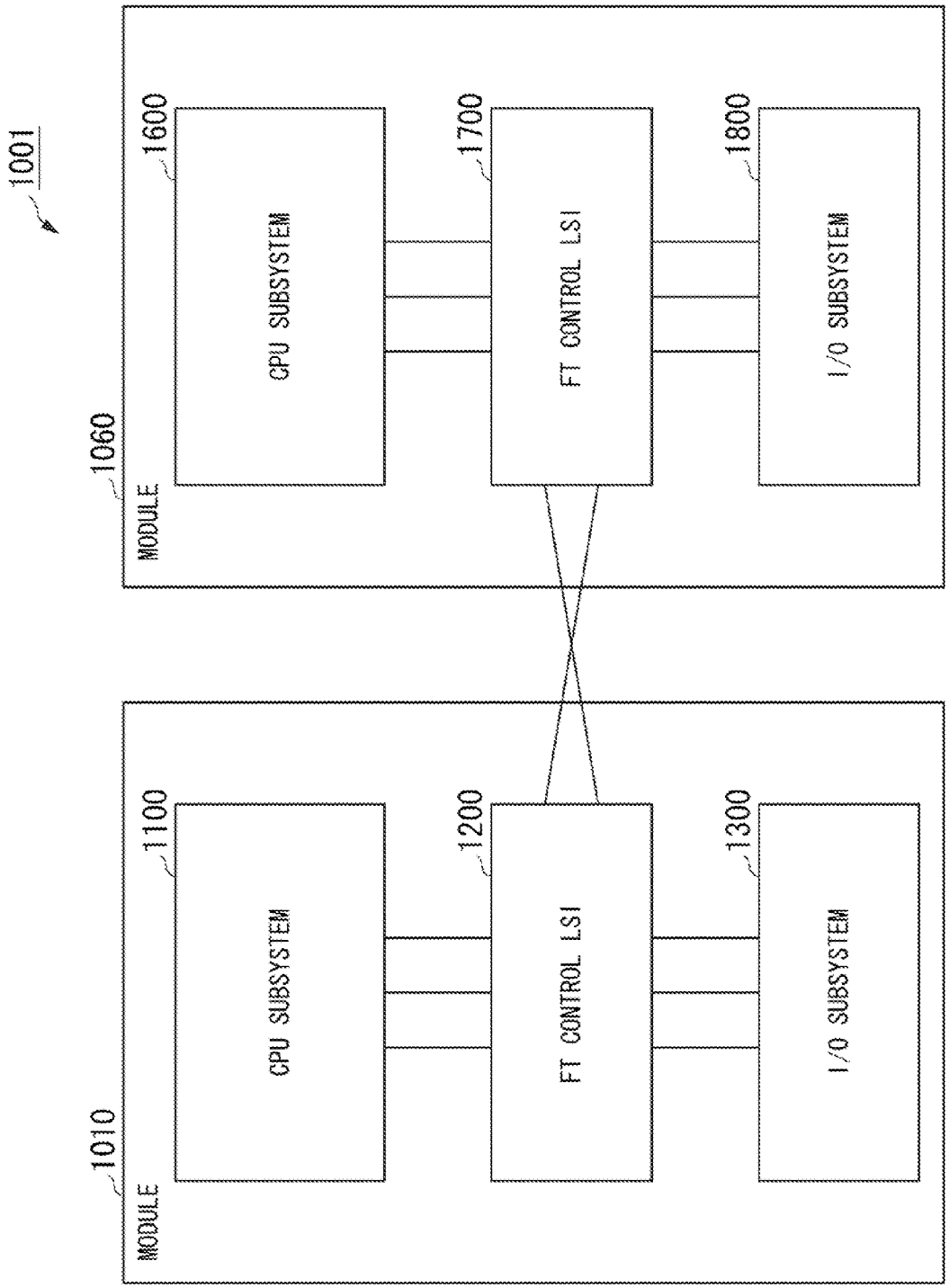
FIG. 11 is a block diagram of the fault-tolerant system in which each module includes a single fault-tolerant control LSI chip.

FIG. 8 is a sequence diagram showing the fault-tolerant control process of the FT server 1, wherein initial setting is made such that the module 10 is placed in an active state whilst the module 60 is placed in a standby state. Both the CPU subsystems 100 and 600 perform the same operation due to the lock step.

I/O requests made by the CPU subsystems 100 and 200 are all forced to pass through the FT control LSI chips 210, 220, 230, installed in the "active" module 10, and then delivered to the I/O subsystem 300. The voters 212, 222, 232 of the FT control LIS chips 210, 220, 230 compare I/O requests of the CPU subsystem 100 installed in the module 10 with I/O requests of the CPU subsystem 600 installed in the counterpart module 60. When both I/O requests match each other, it is confirmed that the CPU subsystems 100 and 600 are involved in the duplex-redundancy state due to the lock step. That is, it is possible to confirm a normal operation mode when both I/O requests match each other without any error detected. In this case, each of the voters 212, 222, 232 selectively outputs one of two I/O requests to the "active" I/O subsystem 300.

In the normal operation mode in which no difference is detected between I/O requests made by two modules so that no error is detected in those modules, the master FT controller 213 stores a command "NULL", indicating no instruction, in a duplex-redundancy packet, which is delivered to the slave FT controllers 223 and 233 in step S101.

Subsequently, the slave FT controllers 223 and 233 partially rewrites the duplex-redundancy packet with status information "DMR" indicating a duplex-redundancy state of the CPU subsystems 100, 600 and a duplex-redundancy state of the I/O subsystems 300, 800; then, the partially rewritten duplex-redundancy packet is sent back to the master FT controller 213 in step S102.

In the normal operation mode, an output of a command "NULL" and a return of status information "DMR" are repeated in step S103 and onwards.

Similarly, the master FT controller of the master FT control LSI chip 710 sends a command "NULL" to the slave FT controllers of the slave FT control LSI chips 720, 730 in step S201. Subsequently, the slave FT controllers send back status information "DMR" to the master FT controller in step S202. The module 60 repeats these operations in step S203 and onwards.

When a fault occurs in the LSI chip of the CPU subsystem or the I/O device of the I/O subsystem, a small time lag occurs until such a fault is notified to the external portion of the LSI chip or the I/O device; hence, a lock-step deviation may be detected beforehand.

FIG. 8 refers to the occurrence of a fault in the I/O hub 130. Due to this fault, the I/O hub 130 operates differently from the hub 630. Thus, the voter 222, installed in the slave FT control LSI chip 220 of the "active" module 10, detects a difference between I/O requests made by the CPU subsystems 100 and 600 in step S111. The slave FT controller 223 of the slave FT control LSI chip 220 sends back status information "DMR Violate", indicating that a lock-step deviation is detected, to the master FT control LSI chip 210 in step S121.

Upon receiving the status information, the master FT control LSI chip 210 notifies a detection event of a DMR deviation in the slave FT control LSI 220 to the master FT control LSI chip 710 of the counterpart module 60 via the cross-link L10 in step S321. In the module 10, a duplex-redundancy packet including a command "Voter Wait", indicating a temporary stoppage and a wait state of a voter, is forwarded to the slave FT control LSI chip 220 via SyncBus in step S122.

In FIG. 8, the slave FT control LSI chip 230 detects a lock-step deviation due to a fault of the I/O hub 130, so that both the slave FT control LSI chips 220 and 230 send back the status information "DMR Violate" to the master FT control LSI 210 in step S123. Upon receiving the status information, the master FT control LSI chip 210 notifies a detection event of a DMR deviation in the slave FT control LSI chips 220 and 230 to the master FT control LSI chip 710 of the counterpart module 60 via the cross-link L10 in step S323. Additionally, the master FT control LSI chip 210 forwards a duplex-redundancy packet including a command "Voter Wait" to the slave FT control LSI chips 220 and 230 via SyncBus in step S124.

In the above, the voter detects a difference between I/O requests, indicating a probability that a fault may occur in either the module 10 or the module 60. To temporarily stop an execution of an I/O request until an error notification clearly indicates a fault position, the master FT control LSI chip 210 forwards a command "Voter Wait" to the slave FT control LSI chips 220 and 230.

Based on a notification of a detection event of a DMR deviation from the master FT control LSI chip 210 (see steps S321, S323), the master FT control LSI chip 710 of the "standby" module 60 forwards a command "Voter Wait" to the slave FT control LSI chips 720 and 730 in steps S222 and S224.

In FIG. 8, the slave FT control LSI chip 220 receiving an error notification from the I/O hub 130 (see step S131) sends back a duplex-redundancy packet, including status information "CPU Error" indicating an error detection of the CPU subsystem 100, to the master FT control LSI chip 210 in step S141.

Upon receiving the duplex-redundancy packet, the master FT control LSI chip 210 sends an error notification to the master FT control LSI chip 710 of the counterpart module 60 via the cross-link L10 in step S341. Additionally, the master FT control LSI chip 210 forwards a duplex-redundancy packet, including a command "Shoot CPU" indicating a logical isolation of the CPU subsystem 100, to the slave FT control LSI chips 220 and 230 in the module 10 in step S142. This command isolates the CPU subsystem 100 alone whilst the I/O subsystem 300 still remains as an active I/O subsystem in the module 10.

Upon receiving the command "Shoot CPU", the slave FT control LSI chips 220, 230 isolate the CPU subsystem 100. Upon completion of isolation, the slave FT control LSI chips 220, 230 send back a duplex-redundancy packet, including status information "CPU Broken" indicating an isolated state of the CPU subsystem 100, to the master FT control LSI chip 210 in step S143.

In the module 60, the master FT control LSI chip 710 sends a duplex-redundancy packet, including a command "Go CPU SMR" indicating that the CPU subsystem 600 needs to operates without duplex redundancy, to the slave FT control LSI chips 720, 730 in step S242, so that the slave FT control LSI chips 720, 730 proceed with a single-redundancy state of the CPU subsystem 600. Subsequently, the slave FT control LSI chips 720, 730 sends back a duplex-redundancy packet, including status information "CPU SMR" indicating a single-redundancy state of the CPU subsystem 600, to the master FT control LSI chip 710 in step S243.

As described above, the CPU subsystem 100 is logically isolated from the FT server 1, so that the FT server 1 maintains its operation by use of the CPU subsystem 600.

When an error occurs in the I/O subsystem under the condition that both the CPU subsystems and the I/O subsystems are placed in the duplex-redundancy state, an I/O device causing an error is isolated.

Specifically, the slave FT control LSI chip, connected to an I/O device causing an error, sends back a duplex-redundancy packet, describing status information "IO Error", to the master FT control LSI chip. Upon receiving the duplex-redundancy packet, the master FT control LSI chip sends a duplex-redundancy packet including a command "Shoot IO". Based on the command "Shoot IO", the slave FT control LSI chip logically isolates an I/O subsystem undergoing an error, thus establishing a state of "IO Broken". In the "standby" module, the master FT control LSI chip sends a duplex-redundancy packet, including a command "Go IO SMR", to the slave FT control LSI chip, which is thus placed in a state of "IO SMR" indicating a single-redundancy state of the I/O subsystem.

As described above, the master FT control LSI chip and the slave FT control LSI chip are connected via SyncBus achieving mutual notification of commands and status information, so that the functionality of the FT control unit can be shared between the master FT control LSI chip and the slave FT control LSI chip. This makes it possible to constitute the FT control units 200 and 700 by use of small-size FT control LSI chips, each of which has connectivity with PCI-Express. Therefore, even though a single LSI chip constituting one FT control unit may need 48-channel PCI-Express connectivity, it is possible to reduce the number of I/O ports per each LSI chip.

The FT control unit adopting the present invention needs a plurality of FT control LSI chips, but downsizing of small-size LSI chips may improve yield of manufacturing LSI chips, thus markedly reducing the total manufacturing cost. The present invention makes it possible to flexibly increase/decrease an I/O bandwidth by appropriately increasing/decreasing the number of slave FT control LSI chips; hence, it is possible to provide various types of FT systems with various numbers of I/O ports based on allowable cost and requirement specification.

Finally, the present invention is not necessarily limited to the present embodiment, which is illustrative and not restrictive; hence, the present invention may embrace design changes and modifications within the scope of the invention defined by the appended claims.

What is claimed is:

1. A fault-tolerant (FT) system comprising
a first module including a first CPU subsystem, a first I/O subsystem, and a first fault-tolerant control unit which is connected between the first CPU subsystem and the first I/O subsystem, wherein the first fault-tolerant control unit further includes a first master fault-tolerant (FT) control LSI chip and a first slave fault-tolerant (FT) control LSI chip;
a second module including a second CPU subsystem, a second master FT control LSI chip, and a second slave FT control LSI chip;
wherein the first module and the second module are configured such that the first module can be in an active state while the second module is in a standby state, and
wherein the first module is configured to perform operations comprising:
the first slave FT control LSI chip receiving a first fault information from the first CPU subsystem or the first I/O subsystem and outputting a first status information, representing reception of the first fault information, to the first master FT control LSI chip;
the first slave FT control LSI chip receiving a plurality of I/O requests, which are equivalent to each other, from the first CPU subsystem and the second module with respect to the first I/O subsystem,
the first slave FT control LSI chip selectively outputting a first I/O request of the plurality of I/O requests to the first I/O subsystem and receiving a response from the first I/O subsystem,
the first slave FT control LSI chip delivering the response to the first CPU subsystem and the second module;
the first master FT control LSI chip sending a command for controlling isolation of a failed subsystem, which is either the first CPU subsystem or the first I/O subsystem, to the first slave FT control LSI chip based on the first status information so as to allow the first slave FT control LSI chip to control isolation of the failed subsystem based on the command,
wherein the second module is configured to perform operations comprising:
the second slave FT control LSI chip receiving the first I/O request from the second CPU subsystem and delivering the first I/O request to the first module and receiving the response to the first I/O request from the first module,
the second slave FT control LSI chip delivering the response to the second CPU subsystem.

2. The fault-tolerant (FT) system according to claim 1, wherein the first master FT control LSI chip and the first slave FT control LSI chip are connected together via a link path, so that the first master FT control LSI chip is configured to perform operations comprising sending the command to the first slave FT control LSI chip via the link path, and the slave FT control LSI chip is configured to perform operations comprising sending the first fault information to the master FT control LSI chip via the link path.

3. The fault-tolerant (FT) system according to claim 1, wherein the first master FT control LSI chip is configured to perform operations comprising sending a duplex-redundancy packet, describing the command and its execute timing, to the first slave FT control LSI chip, and the first slave FT control LSI chip is configured to perform operations comprising executing the command at the execute timing.

4. A master fault-tolerant (FT) control LSI chip carrying out fault-tolerant control on a fault-tolerant system in association with a slave fault-tolerant (FT) control LSI chip connected thereto, said master FT control LSI chip comprising:
a SyncBus input portion that receives fault information output from the slave FT control LSI chip with respect to the fault-tolerant system;
a master FT controller that determines a command for controlling isolation of a failed subsystem, which is found in the fault-tolerant system, based on the fault information;
a SyncBus output portion that outputs the command to the fault-tolerant system; and a cross-link output for outputting an error message to a second master FT control LSI chip;

wherein the master FT control LSI chip is configured to send the command for controlling isolation of the failed subsystem to the slave FT control LSI chip based on a first status information, wherein the command is adapted to cause the slave FT control LSI chip to control isolation of the failed subsystem based on the command.

5. The master FT control LSI chip of claim 4, wherein the failed subsystem comprises a first CPU subsystem or a first I/O subsystem.

6. A slave fault-tolerant (FT) control LSI chip carrying out fault-tolerant control on a fault-tolerant system in association with a master fault-tolerant (FT) control LSI chip connected thereto, said slave FT control LSI chip comprising:

a SyncBus output portion that delivers fault information, representing a failed subsystem found in the fault-tolerant system, to the master FT control LSI chip, wherein the fault information is configured to cause the master FT control LSI chip to output an error-message to a second master FT control LSI chip via a cross-link; and a slave FT controller that controls isolation of the failed subsystem based on a command received from the master FT controller in response to the fault information, wherein the slave FT control LSI chip is configured to receive a command from the master FT control LSI chip, and in response to the command, control isolation of the failed subsystem based on a first status information and the received command.

7. The slave FT control LSI chip of claim 6, wherein the failed subsystem comprises a first CPU subsystem or a first I/O subsystem.

8. A fault-tolerant (FT) control method adapted to a fault-tolerant system including a first module including a first CPU subsystem a first I/O subsystem, and a first fault-tolerant control unit which is connected between the first CPU subsystem and the first I/O subsystem wherein the first fault-tolerant control unit further includes a first master fault-tolerant (FT) control LSI chip and at least one first slave fault-tolerant (FT) control LSI chip and a second module including a second CPU subsystem and a second slave FT control LSI chip, wherein the first module and the second module are configured such that the first module can be in an active state while the second module is set to a standby state, said fault-tolerant control method comprising:

receiving a first information from the first CPU subsystem or the first I/O subsystem with the first slave FT control LSI chip;

outputting, by the first slave FT control LSI chip, a first status information, representing reception of the first fault information, to the first master FT control LSI chip;

receiving, by the first FT control LSI chip, a plurality of I/O requests, which are equivalent to each other, from the first CPU subsystem and the second module with respect to the first I/O subsystem, selectively outputting, by the first slave FT control LSI chip, a first I/O request of the plurality of I/O requests to the first I/O subsystem, receiving, with the first slave FT control LSI chip, a response from the first I/O subsystem, delivering, by the first slave FT control LSI chip, the response to the first CPU subsystem the second module;

receiving, with the second slave FT control LSI chip, the first I/O request from the second CPU subsystem, delivering, by the second slave FT control LSI chip, the first I/O request to first module, and receiving, with the second slave FT control LSI chip, a response to the first I/O request from the first module, delivering, by the second slave FT control LSI chip, the response to the second CPU subsystem; and sending, by the first master FT control LSI chip, a command for controlling isolation of a failed subsystem, which is either the first CPU subsystem or the first I/O subsystem, to the slave FT control LSI chip based on the first status information so as to allow the first slave FT control LSI chip to control isolation of the failed subsystem based on the command.

9. A fault-tolerant (FT) system comprising:

a first CPUA;

a first I/O circuit;

a first master fault-tolerant (FT) controller; and a first slave fault-tolerant (FT) controller, wherein the first slave FT controller is configured to perform operations comprising:

receiving a first fault information from the first CPU or the first I/O circuit;

outputting a first status information to the first master FT controller;

receiving a first CPU I/O request from the first CPU and an external module I/O request from an external module, wherein the first CPU I/O request and the external module I/O request indicate the same content;

outputting a first I/O request to the first I/O circuit, wherein the first I/O request indicates the same content as the first CPU I/O request and the external module I/O request;

receiving a first response from the first I/O circuit;

delivering the first response to the first CPU and the external module;

receiving a first command for controlling isolation of a first failed component; and controlling isolation of the first failed component;

wherein the first master FT controller is configured to perform operations comprising:

receiving the first status information from the first slave FT controller; and sending the first command for controlling isolation of the first failed component to the first slave FT controller.

10. The fault-tolerant (FT) system according to claim 9, wherein the first slave FT controller is further configured to perform operations comprising:

receiving a second CPU I/O request from the first CPU;

delivering the second CPU I/O request to the external module;

receiving a second response from the external module; and delivering the second response to the first CPU.

11. The fault-tolerant (FT) system according to claim 9, wherein the first master FT controller is further configured to perform operations comprising sending the first command to the slave FT controller via a link path, and wherein the slave FT controller is further configured to perform operations comprising sending the fault information to the master FT controller via the link path.

12. The fault-tolerant (FT) system according to claim 9, wherein the first master FT controller is further configured to perform operations comprising sending a first duplex-redundancy packet to the slave FT controller, wherein the first duplex-redundancy packet describes the first command and an execute timing of the first command, and wherein the slave FT controller is further configured to perform operations comprising executing the first command at the execute timing.

13. A master fault-tolerant (FT) controller comprising:
a SyncBus input for receiving a fault information from a slave fault-tolerant (FT) controller;
a master FT controller configured to determine a command for controlling isolation of a failed component based at least in part on the fault information;
a SyncBus output portion for outputting the command; and
a cross-link output for outputting an error-message to a second master FT controller wherein the master FT controller is configured to:
  receive a first status information from the slave FT controller corresponding to first fault information of a first failed component, which is either a first CPU or a first I/O circuit; and
  send a first command for controlling isolation of the first failed component to the slave FT controller.

14. A slave fault-tolerant (FT) controller comprising:
a SyncBus output for delivering fault information to a master fault tolerant (FT) controller, wherein the fault information is configured to cause the master FT controller to output an error-message to a second master FT controller via a cross-link; and
a slave FT controller for controlling isolation of a failed component based at least in part on a command received from the master FT controller;
wherein the slave FT controller is configured to:
  receive a first fault information from a first CPU or a first I/O circuit;
  output a first status information to the master FT controller;
  receive a CPU I/O request from the first CPU and an external module I/O request from an external module;
  output a first I/O request to the first I/O circuit, wherein the first I/O request indicates the same content as the CPU I/O request and the external module I/O request;
  receive a first response from the first I/O circuit;
  deliver the first response to the first CPU and the external module;
  receive a first command for controlling isolation of a first failed component; and
  control isolation of the first failed component.

15. A fault-tolerant (FT) control method comprising:
receiving, with a first slave fault-tolerant (FT) controller, a first fault information from a first CPU or a first I/O circuit;
outputting, with the first slave FT controller, a first status information to a first master fault-tolerant (FT) controller;
receiving, with the first slave FT controller, a first CPU I/O request from the first CPU and an external module I/O request from an external module, wherein the first CPU I/O request and the external module I/O request indicate the same content;
outputting, with the first slave FT controller, a first I/O request to the first I/O circuit, wherein the first I/O request indicates the same content as the first CPU I/O request and the external module I/O request;
receiving, with the first slave FT controller, a first response from the first I/O circuit;
delivering, with the first slave FT controller, the first response to the first CPU and the external module;
receiving, with the first slave FT controller, a first command for controlling isolation of a first failed component; and
controlling, with the first slave FT controller, isolation of the first failed component;
receiving, with the first master FT controller, the first status information from the first slave FT controller;
sending, with the first master fault-tolerant (FT) controller, the first command for controlling isolation of the first failed component to the first slave FT controller.

16. The fault-tolerant (FT) control method of claim 15 further comprising:
receiving, with the first slave FT controller, a second CPU I/O request from the first CPU;
delivering, with the first slave FT controller, the second CPU I/O request to the external module;
receiving, with the first slave FT controller, a second response from the external module; and
delivering, with the first slave FT controller, the second response to the first CPU.

* * * * *